United States Patent
Kullin et al.

(10) Patent No.: US 10,859,113 B2
(45) Date of Patent: Dec. 8, 2020

(54) BEARING ARRANGEMENT FOR FLUID MACHINERY APPLICATION

(71) Applicant: Aktiebolaget SKF, Gothenburg (SE)

(72) Inventors: Arne Lars Jonas Kullin, Landvetter (SE); Juergen Reichert, Donnersdorf (DE); Hans Wendeberg, Västra Frölunda (SE)

(73) Assignee: Aktiebolaget SKF, Gothenburg (SE)

( * ) Notice: Subject to any disclaimer, the term of this patent is extended or adjusted under 35 U.S.C. 154(b) by 0 days.

(21) Appl. No.: 16/221,708

(22) Filed: Dec. 17, 2018

(65) Prior Publication Data

US 2019/0113073 A1 Apr. 18, 2019

Related U.S. Application Data

(63) Continuation of application No. 14/535,451, filed on Nov. 7, 2014, now abandoned.

(30) Foreign Application Priority Data

Nov. 7, 2013 (SE) ........................................ 1300695

(51) Int. Cl.
*F16C 19/54* (2006.01)
*F16C 23/08* (2006.01)
(Continued)

(52) U.S. Cl.
CPC ............ *F16C 19/542* (2013.01); *F16C 19/38* (2013.01); *F16C 19/545* (2013.01); *F16C 19/36* (2013.01);
(Continued)

(58) Field of Classification Search
CPC .... F16C 2360/31; F16C 19/38; F16C 19/385; F16C 19/545; F16C 23/00; F16C 23/06;
(Continued)

(56) References Cited

U.S. PATENT DOCUMENTS 5,586,826 A * 12/1996 Kellstrom ............ F16C 23/086
384/450
6,132,097 A * 10/2000 Kellstrom ............... F16C 33/58
384/450
(Continued)

FOREIGN PATENT DOCUMENTS

DE 102006027543 A1 12/2007
DE 102007036891 A1 2/2009
(Continued)

OTHER PUBLICATIONS

SKF, "SKF Spherical Roller Bearing" SKF Spherical Roller Bearings, May 2007.
(Continued)

*Primary Examiner* — Alan B Waits
(74) *Attorney, Agent, or Firm* — Garcia-Zamor Intellectual Property Law; Ruy Garcia-Zamor; Bryan Peckjian (57) ABSTRACT

A bearing arrangement for a fluid machinery application employing an axially locating bearing. The axially locating bearing includes: a first angular self-aligning contact bearing arranged next to a second angular self-aligning contact bearing. Each of the first angular self-aligning contact bearing and the second angular self-aligning contact bearing includes a set of rolling elements arranged in a row and interposed between a respective curved inner raceway and an associated curved outer raceway. Each roller is a symmetrical cylindrically-shaped roller having a curved raceway-contacting surface. Each roller is inclined respective to the axial direction of the shaft by a respective contact angle. The rollers support an axial force and a radial force. The axially non-locating bearing position is arranged spaced apart from the axially locating bearing position, as seen in the axial direction. Examples of fluid machinery applica-
(Continued)

tions include: a wind turbine, water turbine or a propulsion turbine.

13 Claims, 3 Drawing Sheets

(51) Int. Cl.
*F16C 19/38* (2006.01)
*F16C 19/36* (2006.01)
(52) U.S. Cl.
CPC .......... *F16C 23/08* (2013.01); *F16C 2240/34* (2013.01); *F16C 2300/14* (2013.01); *F16C 2360/31* (2013.01); *Y02E 10/72* (2013.01)
(58) Field of Classification Search
CPC .. F16C 23/08; F16C 2300/14; F16C 2240/34; Y02E 10/722; F03D 80/70
See application file for complete search history.

(56) References Cited

U.S. PATENT DOCUMENTS

| | | | |
|---|---|---|---|
| 7,918,649 B2 * | 4/2011 | Nakagawa | F16C 19/505 384/450 |
| 9,046,128 B2 * | 6/2015 | Silverio | F16C 19/38 |
| 2007/0086689 A1 * | 4/2007 | Qiu | F16C 19/54 384/493 |
| 2007/0297706 A1 * | 12/2007 | Mori | F16C 23/086 384/558 |
| 2008/0272602 A1 * | 11/2008 | Kim | F03D 9/25 290/55 |
| 2011/0150383 A1 * | 6/2011 | Yoshida | F16C 23/08 384/590 |
| 2011/0254279 A1 | 10/2011 | Ventzke | |
| 2012/0121420 A1 * | 5/2012 | Yuki | C21D 1/10 416/174 |
| 2013/0129269 A1 * | 5/2013 | Grehn | F16C 23/08 384/450 |
| 2013/0284539 A1 * | 10/2013 | Kobayashi | F16C 33/6622 184/7.4 |
| 2014/0056705 A1 * | 2/2014 | Zheng | F03D 17/00 416/1 |
| 2014/0119914 A1 * | 5/2014 | Schieke | F03D 7/02 416/1 |
| 2015/0030277 A1 * | 1/2015 | Pick | F16C 19/38 384/558 |
| 2015/0267687 A1 | 9/2015 | Wendeberg | |

FOREIGN PATENT DOCUMENTS

| | | | | |
|---|---|---|---|---|
| DE | 102010054318 A1 | 6/2012 | | |
| DE | 102010054319 A1 | 6/2012 | | |
| EP | 1160469 A2 | 5/2001 | | |
| EP | 1160469 A2 * | 12/2001 | | F16C 23/086 |
| GB | 2112085 A | 7/1983 | | |
| WO | 2007111425 A1 | 10/2007 | | |
| WO | 2013162436 A1 | 10/2013 | | |

OTHER PUBLICATIONS

Schaeffler Technologies GmbH & Co. KG, "The Design of Rolling Bearings" FAG The design of rolling bearings, Jul. 2011.
DIN German Institute for Standardization e.V., "Rolling Bearings—Radial spherical roller bearings—Part 2: Double row, cylindrical and tapered bore" DIN German Institute for Standardization e.V., Jan. 2009.
SK20104US_Original_Translation_&_Certificate_W_Albert_Wälzlager_1039964.

* cited by examiner

BEARING ARRANGEMENT FOR FLUID MACHINERY APPLICATION

CROSS REFERENCE TO RELATED APPLICATIONS

This application is a Continuation of U.S. patent application Ser. No. 14/535,451, filed on 7 Nov. 2014, which claims the benefit of Sweden (SE) Patent Application Number 1300695-2, filed on 7 Nov. 2013, the contents of which are both fully incorporated herein by reference.

FIELD OF THE INVENTION

The present invention pertains to a bearing arrangement for a fluid machinery application, such as a wind turbine arrangement, a water turbine arrangement or a propulsion turbine arrangement. More specifically, the bearing arrangement includes an axially locating bearing position and an axially non-locating bearing position which are capable of supporting axial loads and restricting axial movement of a shaft, such as a rotor shaft of the fluid machinery application.

Moreover, the present invention pertains to a fluid machinery application, such as a wind turbine arrangement, a water turbine arrangement or a propulsion turbine arrangement, comprising a bearing arrangement having an axially locating bearing position and an axially non-locating bearing position.

BACKGROUND ART

In the field of fluid machinery applications, there is an increasing demand for improving the robustness and operation of the components making up the fluid machinery system. In the present context, the term "fluid machinery application" refers to any arrangement that can extract energy from a continuously moving stream of fluid (liquid or gas). Since the fluid machinery application transfers the energy from the fluid to a rotor, and typically is provided with a rotating component through which the fluid passes, the fluid machinery application should be capable of supporting a radial force and a considerable large axial force, as seen in the direction of the rotor shaft of the fluid machinery application. The energy from the fluid streams is converted into mechanical energy of a rotating shaft by one or several turbines. In this type of applications, the rotating component typically refers to the rotor, which is provided with a set of vanes or blades.

One example of a fluid machinery application is a wind turbine arrangement. Other examples of fluid machinery applications are water turbine arrangements and propulsion turbine arrangements. Depending upon the purpose of the fluid machinery application, the working fluid may be either liquid or gas.

In order to support the rotational movement of the rotor, this type of arrangements is typically provided with one or several bearings. Due to the large dimensions and weight of wind turbines, the load bearing capabilities and performance of the bearing(s) supporting the rotor shaft and the wind turbine blades is of high importance. As a consequence, the bearing must be aligned and positioned in a correct manner in order to avoid unnecessary wear of the components making up the bearing.

Typically, for a wind turbine of horizontal, or near horizontal, rotor shaft type, the bearing arrangement must support both axial and radial loads, wherein the axial loads refers to axial loads transferred from the turbine blades during operation as well as axial loads arising from the weight of the rotor shaft and turbine blade arrangement, which is often mounted with a tilted angle in relation to the horizontal plane in order to reduce the risk of collision between the turbine blades and the wind turbine tower.

Moreover, the weight and size of the components as well as the location of the rotor arrangement in tower-like structures increase the cost for manufacturing, mounting, and servicing of the wind turbines. In particular, the attachment of load bearing rolling bearings to the rotor shaft and to support structures is cumbersome and costly, typically involving heating techniques of members, such as the inner ring of a rolling bearing to be mounted, in order to provide suitable attachment and pre-stressing, while maintaining a high level of precision to ensure a correct alignment and orientation of the rolling bearing in relation to the shaft and/or support structure. As a result, the mounting process is complicated and time-consuming, and often requires auxiliary equipment for heating and alignment control measurements. Also, in the hitherto known solutions, the dismounting of the load bearing rolling bearings from the rotor shaft or from the support structures is cumbersome and time-consuming. In other words, mounting and dismounting of the rotor arrangement and the bearing typically require advanced application engineering, while posing high quality requirements on the surrounding parts of the system.

Moreover, in order to ensure that the bearing is capable of being operated under extreme conditions without extensive maintenance, relevant parts of the bearing, such as the raceways, may have to undergo a heat treatment process, such as for instance a hardening process in order to withstand high contact stresses and fatigue damages.

One example of a bearing commonly used in fluid machinery applications, such as wind turbines arrangements, is a spherical roller bearing. A spherical roller bearing is provided with a spherical geometry allowing for self-alignment of the shaft during operation (i.e. upon rotation of the shaft). By self-alignment, the angular alignment of the rotational axis of the rotating shaft may change in relation to the bearing such that an angular movement of the shaft in relation to the housing is permitted. During operation of the rotor shaft arrangement, the axial movement of the rotating shaft must further be restricted by the roller bearing in order to provide a smooth operation and to reduce wear and damage to connected and/or surrounding equipment, such as a gear box etc. Any excessive axial play may considerably reduce the life time of the application arrangement.

Moreover, in order to provide an appropriate and a durable axial locating function of the spherical roller bearing, the size and the radial dimension of the geometry of the spherical roller bearing may be increased. By increasing the size and the radial dimension, the contact angles between the rollers and raceway in relation to the axis of the rotating shaft are increased.

It is believed that similar conditions and requirements are applicable not only to wind turbine arrangements, but also to water turbine arrangements and propulsion turbine arrangements.

Accordingly, hitherto known bearing solutions for fluid machinery applications involving an axially locating roller bearing are considered to suffer from overdesigning in relation to e.g. radial load bearing capacity. Similarly, many of those bearings are non-compact including large bearing designs in order to provide a sufficient axial load bearing capacity. In this manner, this type of bearing is considered to occupy valuable space in the fluid machinery arrangement. Furthermore, larger bearings are more expensive to produce due to high material costs, while the high bearing mass may have a negative impact on the operational efficiency by e.g. increasing the rotational inertia of the arrangement.

It therefore remains a need for a simple bearing arrangement which requires less accuracy requirements of the surrounding parts and reduced application engineering efforts, while maintaining a high capacity to withstand the radial and axial loads from the rotor shaft of the fluid machinery application.

SUMMARY OF THE INVENTION

In view of the above-mentioned and other drawbacks of the prior art, a general object of the present invention is to provide an improved and robust bearing arrangement for a fluid machinery application and a fluid machinery application including such bearing arrangement. The bearing arrangement allows for improved mounting/dismounting of the bearing arrangement in relation to a rotor shaft and/or support structure supporting the rotor shaft.

These and other objects are met by the subject matters provided in the independent claims. Preferred embodiments of the invention are presented in the dependent claims.

According to a first aspect of the present invention, there is provided a bearing arrangement for a fluid machinery application having an axially locating bearing position and an axially non-locating bearing position. The axially locating bearing position comprises a first angular self-aligning contact bearing arranged next to a second angular self-aligning contact bearing for locating a shaft against movement in an axial direction A. The first angular self-aligning contact bearing has a first set of rolling elements formed of rollers arranged in a first row and interposed between a first curved inner raceway and a first curved outer raceway, wherein each roller is a symmetrical cylindrically shaped roller having a curved raceway-contacting surface being engageable with the first curved inner raceway and the first curved outer raceway. Moreover, each roller of the first angular self-aligning contact bearing is inclined in relation to the axial direction of the shaft by a first contact angle $\alpha_2$. Thereby the rollers are arranged to cooperate with the first curved inner raceway and the first curved outer raceway for supporting an axial force $F_1$ and a radial force $F_2$. Analogously, the second angular self-aligning contact bearing has a second set of rolling elements formed of rollers arranged in a second row and interposed between a second curved inner raceway and a second curved outer raceway, wherein each roller is a symmetrical cylindrically shaped roller having a curved raceway-contacting surface being engageable with the second curved inner raceway and the second curved outer raceway. Moreover, each roller of the second angular self-aligning contact bearing is inclined in relation to the axial direction of the shaft by a second contact angle $\alpha_1$. Thereby the rollers of the second set of rolling elements are arranged to cooperate with the second curved inner raceway and the second curved outer raceway for supporting the axial force $F_1$ and the radial force $F_2$. In addition, each roller of the first angular self-aligning contact bearing is inclined in relation to each roller of the second angular self-aligning contact bearing such that a first pressure centre of the first angular self-aligning contact bearing is displaced from a second pressure centre of the second angular self-aligning contact bearing. The axially non-locating bearing position is arranged spaced apart from the axially locating bearing position, as seen in the axial direction A.

As discussed below, one function of the present invention is that the bearing arrangement of the present invention can accommodate local internal misalignments, such as wringing of the rings, which in turn ensures that there will not be any excessive edge contact stresses.

By the principle of the present invention, it becomes possible to provide an improved and more compact fluid machinery application, e.g. a wind turbine arrangement, a water turbine arrangement or a propulsion turbine arrangement. The fluid machinery application is compact in the sense that the bearing function can be arranged within and delivered as a single bearing arrangement system solution. By arranging the bearing arrangement according to the present invention in a fluid machinery application, e.g. a wind turbine rotor shaft arrangement, there is provided an improved and compact technical solution for effectively supporting the radial forces and axial forces of the shaft. This is particularly realized by the arrangement that the axially non-locating bearing position is arranged spaced apart from the axially locating bearing position, as seen in the axial direction A and the specific configuration of the axially non-locating bearing and the axially locating bearing(s). Due to that the bearing arrangement includes two bearing modules (i.e. the axially non-locating bearing position and the axially locating bearing position), the present invention is a two point suspension system, i.e. it is supporting the wind turbine rotor shaft arrangement at a first support point spaced apart from a second support point.

In another embodiment, the bearing arrangement is a three point (3-point) suspension system. For example, the non-locating bearing position may be a non-locating gear box (e.g. a gear box in a wind turbine), whereby the gear box presents a non-locating function, i.e. the gear box is movable in an axial direction of the shaft, and is thereby designed to not accommodate any axial forces, but only radial forces. The gear box may for instance be a planetary gear box supported by bearings, such as tapered roller bearings, cylindrical roller bearings or any other suitable bearing recognized by the skilled person.

In addition, by the provision that the each roller of the first angular self-aligning contact bearing and each roller of the second angular self-aligning contact bearing are inclined in relation to the axial direction and that the first pressure centre of the first angular self-aligning contact bearing is displaced from the second pressure centre of the second angular self-aligning contact bearing, it becomes possible to keep the size of the bearing arrangement to a minimum without compromising the function of the bearing arrangement and/or the fluid machinery application. This is realized by providing axially locating bearings having pronounced tilted contact angles, i.e. inclined contact angles of the first angular self-aligning contact bearing and the second angular self-aligning contact bearing.

Accordingly, the bearing arrangement is typically arranged for supporting a shaft of the fluid machinery application at two different and spaced apart supporting points of the rotor shaft.

Moreover, by tilting the contact angles of the axially locating bearings, the bearing arrangement is capable of maintaining the axial load bearing capacity while the axial width and radial extension of the axially locating bearings may be decreased. In this manner, it becomes possible to reduce the weight of the nacelle weight of the assembled fluid machinery application, e.g. an assembled wind turbine arrangement.

For example, by the provision that both of the angular contact bearings having an inclined contact angle, respectively, the normal direction of the outer raceway, or the entire roller contacting surface of the outer raceway, is angled in relation to the axial direction of the rotor shaft.

It is further to be noted that an angular self-aligning contact bearing according to any one of the described configurations of the first angular self-aligning contact bearing and second angular self-aligning contact bearing may sometimes be denoted as a SAT (self-aligning torus) bearing.

By the configuration of the axially locating bearing position, including the first angular self-aligning contact bearing and the second angular self-aligning contact bearing, there is provided two self-aligning bearings with different pressure centers which result in an arrangement capable of accommodating internal local misalignments, such as wringing of the bearing rings. In other words, by putting together two angular self-aligning contact bearings, the arrangement is capable of accommodating local internal misalignments.

However, it is to be noted that the axially locating bearing position is not in itself considered self-aligning with respect to the shaft (rotor shaft).

Due to the characteristics of an angular self-aligning contact bearing, the clearance is less compared to e.g. an SRB (spherical roller bearing), leading to an axially stiffer arrangement.

Accordingly, by the configuration of the bearing arrangement, it becomes possible to locate a rotor shaft of a fluid machinery application against movement in the axial direction A. In particular, the bearing arrangement is capable of supporting both the axial force $F_1$ and the radial force $F_2$. In this manner, the bearing arrangement allows for locating both the axial and the radial positions of the rotor shaft.

Accordingly, the bearing arrangement is configured to accommodate local misalignment between the rotor shaft and the housing without increasing friction or reducing the service life of the bearing arrangement.

By the configuration of the axially non-locating bearing position in the bearing arrangement, it becomes possible to further support the radial force $F_2$. It is to be noted that the configuration of the axially non-locating bearing(s) in the axially non-locating bearing position is/are not capable of supporting the axial force $F_1$.

In addition, due to the configuration of the bearing arrangement, it is particularly suitable for supporting a rotational movement (i.e. a rotational torque) of the fluid machinery application. Accordingly, the bearing arrangement is configured to accommodate local misalignment between the rotor shaft and the housing without significantly increasing friction or reducing the service life of the bearing arrangement.

In addition, by the configuration of the bearing arrangement, the weight of the rotor shaft arrangement may further be reduced since the stiffness, and thereby the weight, of the shaft may be reduced. This is achieved by the axially locating bearing position due to that bending deflections of the rotor shaft giving rise to angular misalignment at the support point may be compensated, at least on a microscopic level. Also bending deflections of the nacelle framing may be locally compensated by the axially locating bearing position.

By the term "self-aligning" means that angular displacement (misalignment) between an outer ring and an inner ring of an angular self-aligning contact bearing can be accommodated without causing critical negative effects on the performance of the angular self-aligning contact bearing. Hence, the term "self-aligning" means that the inner ring and the outer ring can be angularly displaced in relation to the rotation axis of the angular self-aligning contact bearing. The self-aligning function of the each one of the angular self-aligning contact bearings is provided by having curved contacting surfaces between the rollers and the inner and outer raceways, which allows for compensation of angular misalignment of the rotor shaft in relation to the housing structure of the fluid machinery application.

However, it should be readily appreciated that the configuration of two angular self-aligning contact bearings does not provide an ordinary self-aligning bearing, but, instead, the possibility to accommodate local or internal misalignments of the bearing. Hence, the alignment requirements of the housing structure of the bearing arrangement when being mounted to and fixated in relation to a nacelle framing may be considerable reduced. For example, reduced alignment requirements allow for simplified mounting, dismounting and replacement of individual components of the rotor shaft arrangement.

The self-aligning function (of the angular contact bearing) further allows for some misalignment of the first angular self-aligning contact bearing and/or the second angular self-aligning contact bearing, at least on a microscopic level, if the rotor shaft is subjected to bending, as explained in more detail hereinafter.

The function of misalignment of each angular contact bearing is provided by the configuration of the rolling elements, i.e. the curved profiled rollers and their corresponding curved profiled raceways. If the first angular self-aligning contact bearing is provided with a first inner ring, a first outer ring and a first set of rolling elements, the function of misalignment is provided by the configuration of the first set of curved profiled rolling elements and their corresponding curved profiled raceways. Analogously, if the second angular self-aligning contact bearing is provided with a second inner ring, a second outer ring and a second set of rolling elements, the function of misalignment is provided by the configuration of the second set of curved profiled rolling elements and their corresponding curved profiled raceways.

The self-aligning capability of the axially locating bearing position further allows for that the alignment requirements in relation to the axially non-locating bearing position, and possible associated housing structure supporting the rotor shaft at a different support point along the rotor shaft, may be reduced which improves time and cost efficiency of the manufacturing process. Hence, the alignment requirements of the entire bearing arrangement when being mounted to and fixated in relation to a nacelle framing may be considerable reduced. For example, reduced alignment requirements allow for simplified mounting, dismounting and replacement of individual components of the rotor shaft arrangement.

By the provision that the first angular self-aligning contact bearing is being arranged next to the second angular self-aligning contact bearing, they can be located in a separate bearing housing capable of cooperating to axially locate the rotor shaft in relation to a common housing structure of the fluid machinery application. In this context of the present invention, the first angular self-aligning contact bearing typically is arranged in direct contact with the second angular self-aligning contact bearing. Alternatively, the first angular self-aligning contact bearing may be indirectly in contact with the second angular self-aligning contact bearing.

By having an axially locating bearing in a locating positions and the axially non-locating bearing in the non-locating position, the bearing arrangement is capable of accommodating local misalignment as well as axial movement of the rotor shaft virtually without friction. As such, both bearings can be designed with a tight fit about the rotor shaft.

As mentioned above, each one of the first and second angular self-aligning contact bearings are provided with symmetrical cylindrically shaped rollers. In this context of the present invention, the term "symmetrical" means that each roller in the set of the rolling elements of the first angular self-aligning contact bearing and/or the second angular self-aligning contact bearing has a symmetrical shape, wherein the axial ends of the roller are equal, or symmetric, with each other, i.e. having similar dimensions, such as similar radial dimensions. In more detail, each roller may comprise a first axis of symmetry which coincides with the rotational axis of the roller, and a second axis of symmetry which is orthogonal to the first axis of symmetry. In other words, each roller may have a shape having at least two separate orthogonal axes of symmetry.

The symmetrical cylindrically shaped rollers and the corresponding raceways of the first angular self-aligning contact bearing and the second angular self-aligning contact bearing allow for reliable operation as wells as cost and time efficient manufacturing. Furthermore, the symmetrical cylindrically shaped rollers are maintained in a functional reliable alignment in relation to the inner and outer raceways in the axial direction during operation due to the adapted curved shaped of the rollers and raceways. Hence, there might not be any need for guiding flanges or guiding projections from any of the inner or outer raceways in order to ensure that the rollers are maintained in a correct interposed position between the inner and outer rings.

The absence of a guiding flange or guide ring is another distinguishing feature of the present invention in view of a conventional spherical roller bearing. This difference in features between the present invention and a conventional spherical roller bearing, may be positively expressed in that the first angular self-aligning contact bearing is free from a guiding flange. Analogously, the second angular self-aligning contact bearing is free from a guiding flange. Since neither the first angular self-aligning contact bearing nor the second angular self-aligning contact bearing does not require a guiding flange, the design of the bearing arrangement is further simplified compared to conventional bearing solutions, which contributes to reduced the manufacturing costs of present invention. The bearing arrangement can be produced without a guiding flange since the axial loads are completely carried by the interaction of the curved inner and outer raceways and the curved contact surfaces of the rollers.

The geometry of the roller elements and the inner and outer raceways further reduces the static and dynamic friction of the bearing allowing for more efficient starting and output from e.g. a wind turbine arrangement during operation.

The symmetrical cylindrically shaped rollers self-adjust, providing an even load distribution along the roller length. This provides very high load carrying capacity under all load combinations.

The first set of rollers and/or the second set of rollers may typically include a plurality of roller elements, e.g. 30-60 rollers, or even more than 100, although fewer of additional rollers could be used dependent on the required function, load capacity and/or size of the bearing unit.

It should be readily understood that each one of the first and second angular self-aligning contact bearings are provided with an internal clearance which is set by the distance between the inner curved raceways (or the two inner rings). The clearance is split between the two contact bearings and can range from negative (preload) via zero to positive. Typically, the rollers and raceways are manufactured as standard with normal internal clearance.

In summary, by the present invention, there is provided a bearing arrangement having an optimized internal geometry, while conferring maximum radial and axial load carrying capacity for a two point suspension system or a three-point suspension system. The present invention is further robust in the sense that the bearing arrangement is less sensitive to misalignment caused by shaft or housing deflections as a result of heavy loads. Since the axially non-locating bearing position and the axially locating bearing position can be provided in the form of a single bearing arrangement system solution, the mounting of the bearing arrangement may further be simplified, enabling a more efficient and compact two point suspension fluid machine designs.

Typically, the axially non-locating bearing position may comprise a third set of rolling elements formed of rollers arranged in a third row and interposed between a third curved inner raceway of a third inner ring and a third curved outer raceway of a third outer ring. In this context of the present invention, each roller of the third set of rolling elements is a symmetrical cylindrically shaped roller having a third curved raceway-contacting surface being engageable with the third curved inner raceway and the third curved outer raceway. Hereby, the rollers are arranged to cooperate with the third curved inner raceway and the third curved outer raceway for supporting the radial force $F_2$.

In other words, the third set of rolling elements formed of rollers is arranged in an intermediate configuration between the third inner ring and the third outer ring. Thereby, the third outer ring encircle the third inner ring such that the third set of rolling elements formed of rollers is arranged in an intermediate configuration between the third inner ring and the third outer ring.

Accordingly, the axially non-locating bearing here is not configured for supporting the axial force $F_1$.

In the context of the present invention, the first contact angle $\alpha_2$ and/or second contact angle $\alpha_1$ may be defined as the angle between a straight line normal to a centre axis of a roller and the centre axis of the rotor shaft (i.e. a straight line parallel to the plane of rotation). The straight line may also represent the line along which the resulting load is transmitted via the roller element from one raceway to another raceway.

Accordingly, the first pressure centre $P_1$ of the first angular self-aligning contact bearing may be defined by a normal from the raceway to the centre axis of the rotor shaft. Analogously, the second pressure centre $P_2$ of the second angular self-aligning contact bearing may be defined by a normal from the raceway to the centre axis of the rotor shaft.

Accordingly, by the provision that the first pressure centre $P_1$ of the first angular self-aligning contact bearing is displaced from the second pressure centre $P_2$ of the second angular self-aligning contact bearing means that there is no intersection between the normal to the first raceway of the first contact bearing and the normal to the second raceway of the second contact bearing along the centre axis of the rotor shaft.

By the configuration of the displaced pressure centers, the bearing is capable of accommodating local misalignments as mentioned above.

The first contact angle $\alpha_2$ of the first angular self-aligning contact bearing and/or the second contact angle $\alpha_1$ of the second angular self-aligning contact bearing may also be defined as the angle between the rotational axis of the symmetrical rollers and the centre axis of the rotor shaft.

That is, the first contact angle $\alpha_2$ between each roller and any one of the first curved inner raceway and the first curved outer raceway is inclined in relation to the axial direction of the shaft. Analogously, the second contact angle $\alpha_1$ between each roller of the second set of rolling elements and any one of the second curved inner raceway and the second curved outer raceway is inclined in relation to the axial direction of the shaft.

The value of the first contact angle $\alpha_2$ of the first angular self-aligning contact bearing should be appropriately selected. However, in order to provide a tilted or an inclined first angular self-aligning contact bearing, the angle cannot be equal to 0 degrees or 90 degrees. As an example, the value of the first contact angle $\alpha_2$ may be between 10-60 degrees. Still preferably, the value of the first contact angle $\alpha_2$ may be between 20-50 degrees. Still preferably, the value of the first contact angle $\alpha_2$ may be between 35-45 degrees. In one example embodiment, the value of the first contact angle $\alpha_2$ is approximately 45 degrees.

Analogously, the value of the second contact angle $\alpha_1$ of the second angular self-aligning contact bearing should be appropriately selected. However, in order to provide a tilted or an inclined second angular self-aligning contact bearing, the angle cannot be equal to 0 degrees or 90 degrees. As an example, the value of the second contact angle $\alpha_1$ may be between 10-60 degrees. Still preferably, the value of the second contact angle $\alpha_1$ may be between 20-50 degrees. Still preferably, the value of the second contact angle $\alpha_1$ may be between 35-45 degrees. In one example embodiment, the value of the second contact angle $\alpha_1$ is approximately 45 degrees.

In addition, or alternatively, the value of the first contact angle $\alpha_2$ may be distinct from the value of the second contact angle $\alpha_1$. In this manner, the axially locating bearing position may be provided with asymmetric rows, i.e. the inclination of the first row of the first set of rollers is different to the inclination of the second row of the second set of rollers. One advantage with this configuration is that the size of the axially locating bearing(s) can be adjusted to meet the demands of a certain wind turbine arrangement and/or be adjusted in relation to the design of the axially non-locating bearing position. In other words, the size of the bearing arrangement can kept to a minimum.

In one example embodiment, the value of the first contact angle $\alpha_2$ may be equal to the value of the second contact angle $\alpha_1$.

Alternatively, the value of the first contact angle $\alpha_2$ may be smaller than the value of the second contact angle $\alpha_1$.

Alternatively, the value of the first contact angle $\alpha_2$ may be larger than the value of the second contact angle $\alpha_1$.

In one example embodiment, the first curved inner raceway may be arranged in a first inner ring of the first angular self-aligning contact bearing. In addition, or alternatively, the first curved outer raceway may be arranged in a first outer ring of the first angular self-aligning contact bearing. The outer ring may encircle the inner ring, whereby the set of rolling elements formed of the rollers is arranged in an intermediate configuration between the first inner ring and the first outer ring.

Analogously, the second curved inner raceway may be arranged in a second inner ring of the second angular self-aligning contact bearing. In addition, or alternatively, the second curved outer raceway may be arranged in a second outer ring of the second angular self-aligning contact bearing. The second outer ring may encircle the second inner ring, whereby the set of rolling elements formed of the rollers is arranged in an intermediate configuration between the second inner ring and the second outer ring.

Any one of the first inner ring and the second inner ring may be provided in the form of a flangeless inner ring.

According to one exemplary embodiment, the first and second curved outer raceways are arranged in one common outer ring. According to another exemplary embodiment, the first and second inner raceways are arranged in one common inner ring.

According to one exemplary embodiment, the inner rings of the locating and non-locating bearings are rotating and the outer rings are stationary. In another embodiment, the outer rings of the locating and non-locating bearings are rotating and the inner rings are stationary.

According to one exemplary embodiment, the curved outer raceway of the first angular self-aligning contact bearing and the curved outer raceway of the second angular self-aligning contact bearing may facing away from each other, as seen in the axial direction A. In other words, the pair of the first angular self-aligning contact bearing and the second angular self-aligning contact bearing is mounted in a so-called back-to-back arrangement, also sometimes denoted O-arrangement.

According to one exemplary embodiment, the curved outer raceway of the first angular self-aligning contact bearing may facing the curved outer raceway of the second angular self-aligning contact bearing, as seen in the axial direction A. In other words, the pair of the first angular self-aligning contact bearing and the second angular self-aligning contact bearing here is mounted in a so-called face-to-face arrangement, also sometimes denoted X-arrangement.

The first angular self-aligning contact bearing and the second angular self-aligning contact bearing may be contained in a bearing housing spaced apart from the axially non-locating bearing, as seen in the axial direction A. Typically, the first angular self-aligning contact bearing and the second angular self-aligning contact bearing may be contained in a separate first bearing housing, while the axially non-locating bearing is contained in a different second bearing housing, which is spaced apart from the first bearing housing. However, both the axially non-locating bearing and the axially locating bearing(s) may be contained and delivered in one common non-rotating housing structure so as to constitute an entire bearing arrangement system solution.

In addition, or alternatively, the outer ring of the bearing arrangement may be provided with one or several lubrication holes so as to facilitate efficient bearing lubrication.

Typically, but not necessarily, the first set of the rollers may be contained in a window-type cage. In addition, or alternatively, the second set of the rollers may be contained in another window-type cage. The window-type cage may be centered on the flangeless inner ring via a floating guide ring between the two rows of rollers. The window-type cage can be made of machined brass or steel cage. Steel and brass cages are strong as well as tolerant to high temperatures and all lubricants.

In addition, or alternatively, the self-aligning bearing may include a bearing seal arranged in the bearing axially outside the race tracks and designed to bridge the space between the inner ring and the outer ring. Besides that the seal prevent contaminants from entering the raceways, the seal further has the function of retaining lubricant in the available space between the raceways and the rolling elements.

The present invention is particularly suitable for fluid machinery application such as wind turbine arrangement, water turbine arrangement or a propulsion turbine arrangement. It should be readily appreciated that the direction of the radial load and the axial load may vary depending on whether the fluid machinery application is a wind turbine arrangement, water turbine arrangement or a propulsion turbine arrangement. Likewise, for a propulsion turbine arrangement, the direction of the radial load and the axial load may vary depending on whether a motor, being operatively connected to the propeller shaft, is operated in forward or reverse. In any case, and regardless of the direction of the loads, the bearing arrangement is capable of supporting both a radial force and an axial force while the fluid machinery application is in operation.

According to a second aspect of the present invention, there is provided a fluid machinery application, such as wind turbine arrangement, water turbine arrangement or a propulsion turbine arrangement, comprising a bearing arrangement according to any one of the aspects and/or example embodiments as mentioned above.

Effects and features of this second aspect of the present invention are largely analogous to those described above in relation to the first aspect of the present invention.

Typically, the fluid machinery application may further comprise a rotor shaft, wherein the axially locating bearing(s) of the bearing arrangement is arranged for supporting a radial force $F_2$ and an axial force $F_1$ of the rotor shaft of the fluid machinery application at a first support point, whilst the axially non-locating bearing is arranged to support the radial force of the rotor shaft at a second support point.

Accordingly, the first support point is arranged spaced apart from the second support point along the axial direction A of the rotor shaft. In this manner, the rotor shaft is supported by a two-point suspension bearing arrangement, wherein the two points are formed of the first support point and the second support point and the corresponding axially locating bearing(s) and the axially non-locating bearing.

In this manner, the axially locating bearing(s) is/are capable of axially locating the rotor shaft. It is to be noted that the locating bearing, i.e. the arrangement of the first angular self-aligning contact bearing and the second angular self-aligning contact bearing, typically is arranged further to the gearbox than the non-locating bearing. However, it is also possible that the positions of the bearings are arranged in an opposite manner, i.e. the non-locating bearing(s) is/are arranged further to the gear box than the locating bearing.

The rotor shaft may be operatively connected to turbine blades, whereby the rotor shaft is capable of supporting the rotational movement of the turbine blades.

In one example embodiment, the bearing arrangement may be contained in a non-rotating housing structure of the fluid machinery application.

The axially locating bearing position and the axially non-locating bearing position may be spaced apart, for instance, by a distance of 50%, or 75%, or 100%, or 150% of the outer diameter of the rotor shaft at the first support point.

Typically, locating bearing may be secured in a first bearing housing and on the rotor shaft 2, whilst the axially non-locating bearing 12 may be designed to move axially on its seating in a second bearing housing.

According to a third aspect of the present invention, there is provided a use of the bearing arrangement, according to any one of the aspects and/or example embodiments as mentioned above, in a fluid machinery application. In this context of the present invention, the bearing arrangement is configured for supporting radial and axial forces of the shaft in the fluid machinery application.

Effects and features of this third aspect of the present invention are largely analogous to those described above in relation to the first aspect and second aspect of the present invention.

The fluid machinery application may be of a horizontal or nearly horizontal type. Besides including a rotor shaft operatively connected to a set of turbine blades, the fluid machinery application may comprise a non-rotating support structure for supporting the rotor shaft. The support structure may be arranged to be mounted to a turbine nacelle framing. In this context of the present invention, the bearing arrangement may be arranged to support the rotor shaft in relation to the non-rotating support structure at a first support point and a second support point.

The rotor shaft arrangement may further comprise an attachment portion for securing any one of the inner rings of the bearings to the rotor shaft. As an example, the attachment portion may comprise a radial outer support surface for an inner support surface of any one of the first, second and third inner rings.

In addition, or alternatively, the radial outer support surface of the attachment portion may be expanded radial outwards for securing any one of the inner rings by an expansion member being driven into the attachment portion. In this manner, it becomes possible to provide an improved and more efficient mounting of the rotor shaft arrangement. More specifically, by securing any one of the inner rings of the bearing arrangement to an attachment portion of e.g. a rotor shaft by expanding the attachment portion radial outwards with an expansion member, it becomes possible to provide a pressure fit between the attachment portion and any one of the inner rings. Thereby, the inner rings may advantageously be arranged in the correct position and alignment in relation to the attachment portion before the attachment portion is expanded. Hence, mounting may be considerably facilitated by separating the positioning and alignment step from the attachment step during the mounting process. As an example, the expansion of the attachment portion in the radial outward direction provided by the expansion member is between 1 and 2000 microns, or between 5 and 500 microns.

According to one example embodiment, the attachment portion may be formed by the rotor shaft. Thereby, the inner rings of the bearing arrangement are securely attached to the rotor shaft being supported by a non-rotating surrounding support structure, wherein the attachment portion forms part of the rotor shaft.

According to another example embodiment, the attachment portion may be formed by the non-rotating support structure. Thereby, the inner rings of the bearing arrangement are securely attached to the support structure, such as a radial inner non-rotating support structure of a radial outer circumferential hollow rotor shaft or hub, wherein the attachment portion forms part of the support structure.

According to a further example embodiment of the present invention, it further relates to a wind turbine arrangement comprising the wind turbine rotor shaft arrangement and a nacelle framing (housing), wherein the rotor shaft is supported by and mounted to the nacelle framing via the non-supporting housing structure.

Further features of, and advantages with, the present invention will become apparent when studying the appended claims and the following description. The skilled person may realize that different features of the present invention may be combined to create embodiments other than those described in the following, without departing from the scope of the present invention. For example, the above description of the different advantages of the present invention is primarily described in relation to a bearing arrangement for a wind turbine rotor arrangement, however, the various embodiments of the invention are of course also applicable when the fluid machinery application is a water turbine arrangement or a propulsion turbine arrangement.

BRIEF DESCRIPTION OF THE DRAWINGS

Embodiments of the invention will now be described, by way of example and with reference to the accompanying drawings, in which.

It should be understood that the drawings are not true to scale and, as is readily appreciated by a person skilled in the art, dimensions other than those illustrated in the drawings are equally possible within the scope of the invention. Moreover, it should be readily understood that some details in the drawings may be exaggerated in comparison with other details. Furthermore, some of the drawings have been simplified by removing some details relating to the rotational symmetry of the bearing arrangement.

DETAILED DESCRIPTION OF EXEMPLARY EMBODIMENTS OF THE INVENTION

The present invention will now be described more fully hereinafter with reference to the accompanying drawings, in which exemplary embodiments of the invention are shown. The invention may, however, be embodied in many different forms and should not be construed as limited to the embodiments set forth herein; rather, these embodiments are provided for thoroughness and completeness. Like reference characters refer to like elements throughout the description.

Figure 1A:
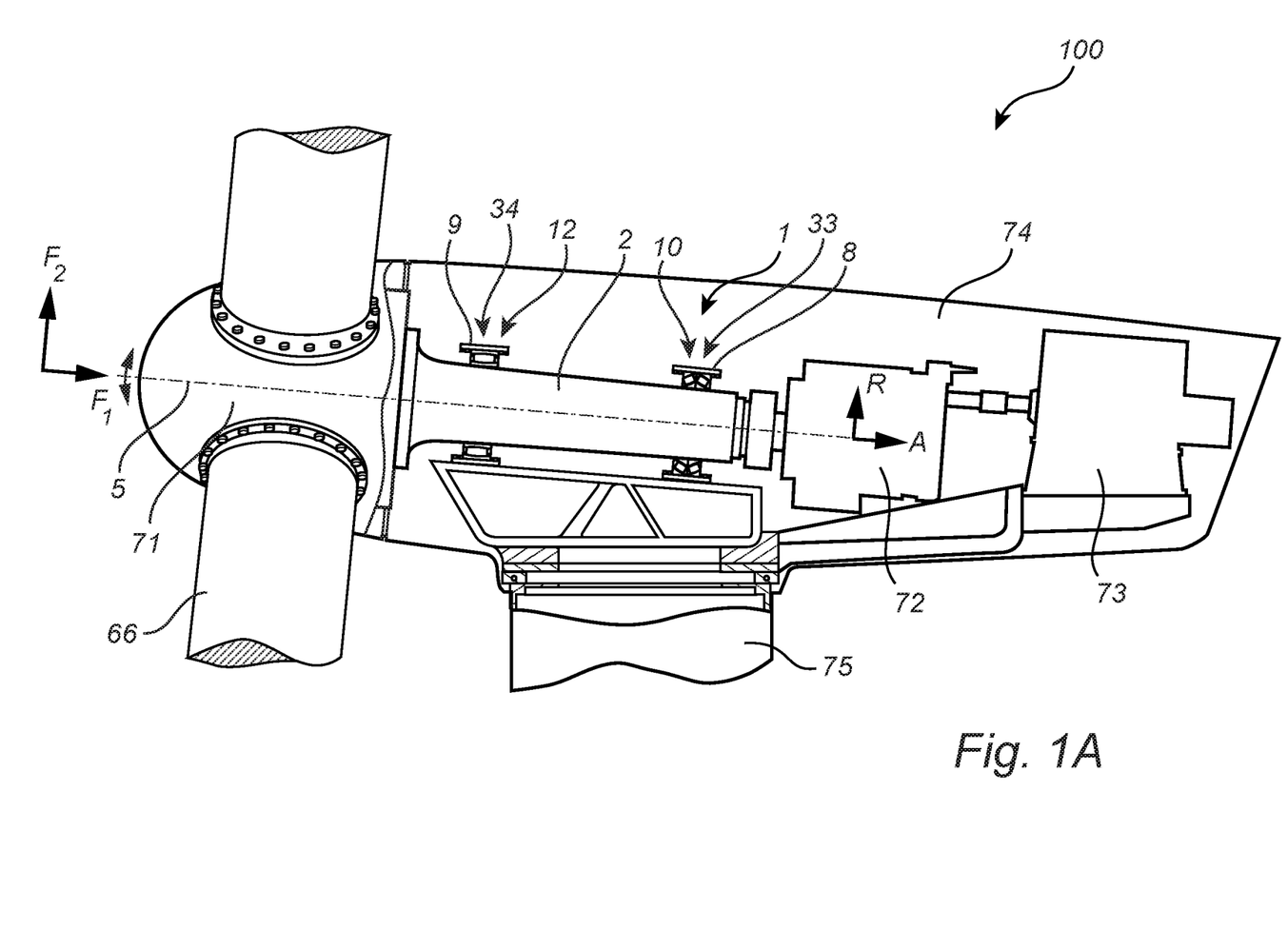
FIG. 1a is a schematic perspective view of an example embodiment of a fluid machinery application according to the present invention, in which the fluid machinery application is a wind turbine rotor shaft arrangement.
Figure 1B:
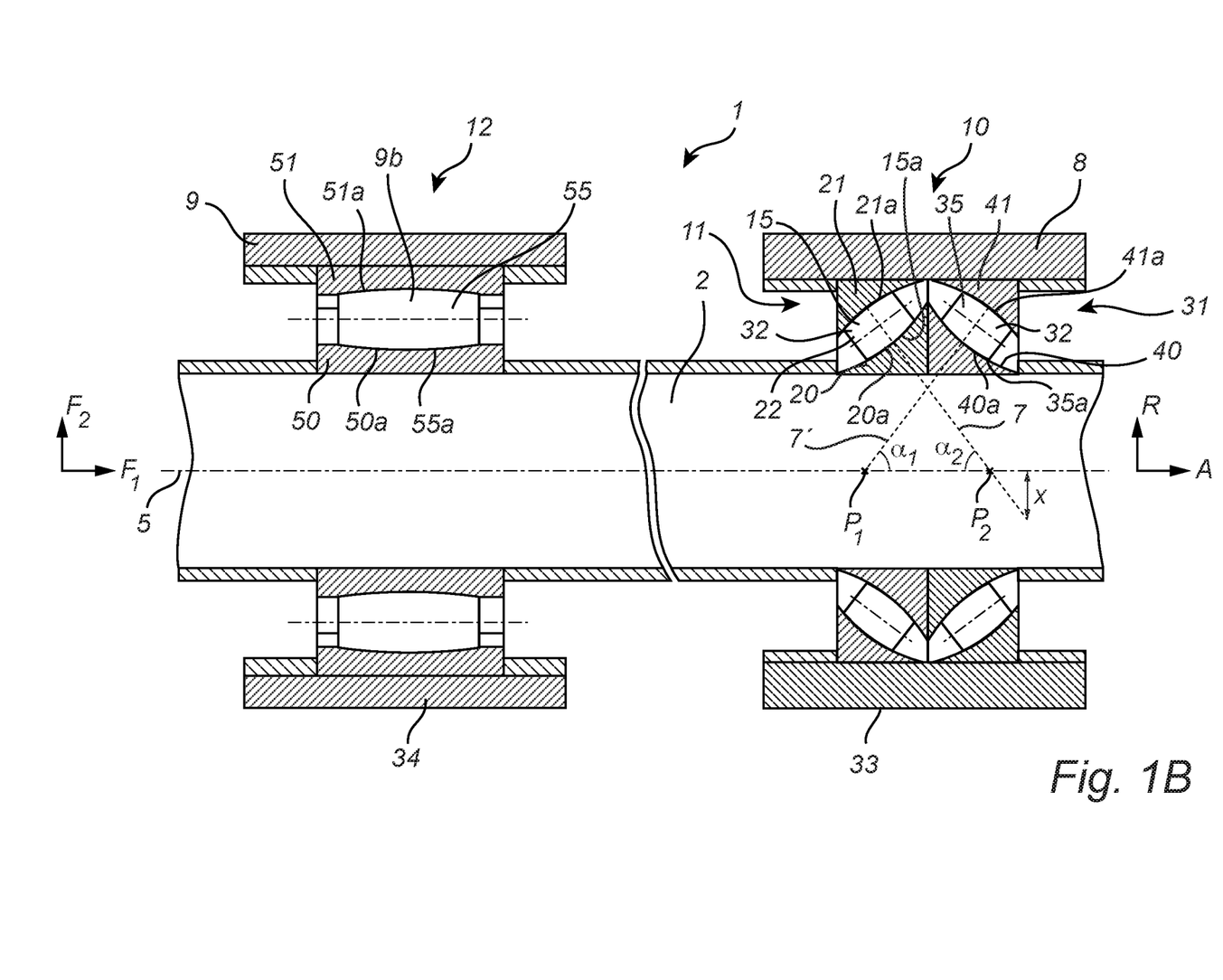
FIG. 1b is a schematic cross-sectional view of an example embodiment of a bearing arrangement for a fluid machinery application according to the present invention, wherein the bearing arrangement includes an axially locating bearing position and an axially non-locating bearing.

Referring now to the figures and FIGS. 1a-1b in particular, there is depicted a bearing arrangement for a fluid machinery application according to an example embodiment of the present invention.

Although the following description has been made on a wind turbine arrangement, the present invention may as well be implemented in a water turbine arrangement. In addition, the present invention may also be implemented in a propulsion turbine arrangement. As used herein, the term "fluid machinery application" therefore means any arrangement that can extract energy from a continuously moving stream of fluid (liquid or gas) and is suitable for supporting a radial force and a considerable large axial force, at least in one direction of the shaft of the fluid machinery application.

FIG. 1a schematically illustrates the bearing arrangement 1 arranged in a fluid machinery application in the form of a wind turbine arrangement 100. Due to the configuration of the bearing arrangement, as will be further described hereinafter, the bearing arrangement is capable of supporting an axial force $F_1$ and a radial force $F_2$.

In FIG. 1a, there is depicted a wind turbine rotor shaft arrangement 100 comprising a rotor shaft 2 for supporting a set of wind turbine blades 66. The rotor shaft 2 here extends axially along a rotor axis A. The rotor shaft 2 is arranged to be rotatably mounted in a nacelle framing arranged in the top of a tower-like support structure of a wind turbine having a horizontal, or nearly horizontal, orientation of the rotor shaft. However, the wind turbine rotor shaft arrangement 100 is not limited to a horizontal type orientation, but may also be used in wind turbines applications having a tilted or a vertical type rotor shaft orientation. The orientation of the rotor shaft is defined in relation to its intended mounted operational position in a nacelle framing of an operational wind turbine.

The rotor shaft 2 here is operatively connected to a set of wind turbine blades 66 via a hub arrangement 71, whereby the rotor shaft is capable of supporting the rotational movement of the turbine blades 66.

Figure 2A:
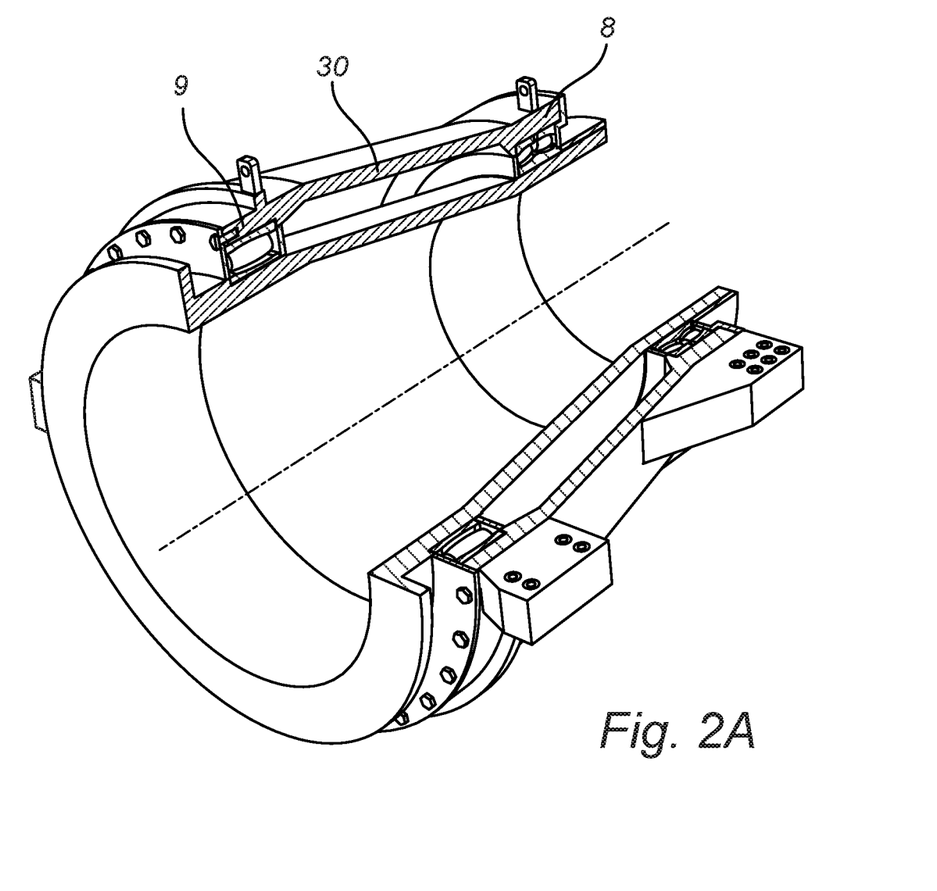
FIG. 2a is a schematic perspective view of an example embodiment of a fluid machinery application according to the present invention, in which the fluid machinery application is a wind turbine rotor shaft arrangement and provided with a non-rotating support structure.

As further illustrated in FIGS. 1a-1b and 2a, the rotor shaft 2 is supported to a wind turbine nacelle housing 74 by means of the bearing arrangement 1 at a first support point 33 and a second support point 34. The bearing arrangement 1 includes an axially locating bearing position 10 and an axially non-locating bearing 12. The axially locating bearing position 10 comprises a first angular self-aligning contact bearing 11 arranged next to a second angular self-aligning contact bearing 31 for locating the shaft 2 against movement in an axial direction A.

The axially locating bearing position 10 is arranged to support the rotor shaft at a first support point 33. In this manner, the axially locating bearing position 10 is a locating bearing capable of axially locating the rotor shaft 2. It is to be noted that the locating bearing position 10, typically is arranged further to the gearbox than the non-locating bearing 12. However, it is also possible that the positions of the bearings are arranged in an opposite manner, i.e. the non-locating bearing 12 is arranged further to the gear box than the locating bearing position 10.

Moreover, the axially non-locating bearing 12 is arranged to support, in a second opposite axial direction, the rotor shaft 2 at a second support point 34.

Accordingly, the first support point 33 is arranged spaced apart from the second support point 34 along the axial direction A of the rotor shaft 2. Hence, the axially locating bearing position 10 is arranged spaced apart from the axially non-locating bearing 12.

In this manner, the rotor shaft 2 is supported by a two-point bearing arrangement, wherein the two points are formed of the first support point 33 and the second support point 34 and the corresponding axially locating bearing position 10 and the axially non-locating bearing 12.

By the arrangement of the bearing arrangement 1 in the wind turbine rotor shaft arrangement 100, the bearing arrangement 1 is capable of axially locate and secure the rotor shaft in relation to the housing structure and the nacelle framing. The configurations of the axially locating bearing position 10 and the axially non-locating bearing 12 are further explained herein below.

As is illustrated in FIG. 1a, the axially non-locating bearing 12 here is contained in a housing 9 (the axially non-locating bearing housing). Analogously, the axially locating bearings 10 here are contained in another housing 8 (axially locating bearing housing). The axially non-locating bearing housing 9 and the axially locating bearing housing 8 may be arranged to be separately mounted in the nacelle framing (nacelle housing 74), as shown in FIG. 1a.

For instance, the axially locating bearings 10 are secured in the housing 8 and on the rotor shaft 2, whilst the axially non-locating bearing 12 may be designed to move axially on its seating in the housing 9. However, in this embodiment, the axially locating bearing 12 is a toroidal roller bearing, which is secured in the housing 9. The toroidal roller bearing has the capability to relatively misalign its bearing rings as well as relatively displace its bearing rings in the axial direction of the bearing.

Although not strictly required, the bearing arrangement 1 can further be accommodated in a non-rotating housing structure 30 at the support points 33, 34 for supporting the rotor shaft 2 in relation to the wind turbine nacelle framing 74, as is shown in FIG. 2a. For example, the housing structure 30 can either be a part of the nacelle framing structure or a separate part, but likewise an integral part, of the nacelle framing structure or nacelle housing 74.

The arrangement 100 here is arranged in the wind turbine housing 74, which is located in a tower-like support member 75.

The bearing arrangement 1 can be arranged in several different ways. Hence, in one example embodiment, as illustrated in FIG. 1a, the rotor shaft 2 here is connected to a gear box 72 for shifting the rotational speed of the rotor shaft 2 before coupling the rotation of the rotor shaft 2 to a generator 73.

In another example embodiment (although not shown), the rotor shaft 2 may be directly coupled to a generator without shifting the rotational speed of the rotor shaft with a gear box. In this example embodiment, the generator may be arranged radially outside the bearing arrangement 1.

Although not shown in the Figures, the bearing arrangement 1 may be operatively secured to an attachment portion of the rotor shaft 2 by means of an expansion member to facilitate assembly of the bearing arrangement to the rotor shaft.

The axially locating bearing position 10 and the axially non-locating bearing position 12 may be separated, for instance, by a distance of 50%, or 75%, or 100%, or 150% of the outer diameter of the rotor shaft at the first support point 33.

Optionally, any one of the bearings 10, 12 may comprise cages, or retainers, for the rolling elements.

Moreover, depending on the design of the wind turbine rotor shaft, the axially separated bearings, i.e. the axially non-locating bearing 12 and the axially locating bearings 10 may be arranged to have substantially no axial play, or be arranged with a suitable axial play. In addition, the two angular contact bearings 11, 31 (as described below) may be arranged with a suitable axial play that is split between the two contact bearings, and which can range from negative (preload) via zero to positive.

Due to the rotational movement of the set wind turbine blades 66, the rotor shaft is subjected to an axial force $F_1$ and a radial force $F_2$, as seen in the axial direction A of the rotor shaft 2. By arranging the bearing arrangement 1 according to the present invention in the wind turbine rotor shaft arrangement 100, there is provided an improved and compact technical solution for effectively supporting the radial forces and axial forces of the shaft. This is particularly realized by the arrangement that the axially non-locating bearing 12 is arranged spaced apart from the axially locating bearing position 10, as seen in the axial direction A and the specific configuration of the axially non-locating bearing 12 and the axially locating bearing position 10, which will now be further described. It is to be noted that the axially non-locating bearing 12 is only capable of supporting the radial force $F_2$, whilst the axially locating bearing position 10 is capable of supporting both the axial force $F_1$ and the radial force $F_2$.

With particular reference to FIG. 1b, the bearing arrangement 1 comprises a axially locating bearing position 10. The axially locating bearing position 10 comprises a first angular self-aligning contact bearing 11 arranged next to a second angular self-aligning contact bearing 31 for locating the shaft 2 against movement in the axial direction A.

Typically, but not necessarily, the first angular self-aligning contact bearing 11 here is provided with a first inner ring 20 and a first outer ring 21. As is illustrated in FIG. 1b, the first inner ring is a flangeless inner ring, i.e. the inner ring is free from a guiding flange.

As shown in FIG. 1b, the outer ring 21 is positioned radially outside the inner ring 20.

It should be readily understood that the first inner ring 20 typically is movable in relation to the first outer ring 21 in the axial direction of the rotor shaft 2.

The first angular self-aligning contact bearing 11 further has a first set of rolling elements formed of rollers 15 arranged in a first row 22. By being arranged in a first row means that the first set of rollers 15 are circumferentially arranged around the rotor shaft 2 in a row.

Moreover, the first set of rollers 15 are interposed between a first curved inner raceway 20a of the first inner ring and a first curved outer raceway 21a of the first outer ring.

However, it should be readily appreciated that the first curved inner raceway 20a may alternatively be formed directly in a part of the shaft 2 and is therefore not necessarily always part of an inner ring.

As may be gleaned from FIG. 1b, each roller 15 is a symmetrical cylindrically shaped roller having a curved raceway-contacting surface 15a being engageable (or in contact) with the first curved inner raceway 20a and the first curved outer raceway 21a.

Moreover, each roller 15 of the first angular self-aligning contact bearing 11 is inclined in relation to the axial direction of the shaft 2 by a first contact angle $\alpha_2$. Thus, each roller 15 is inclined in relation to the axial direction of the shaft 2 whereby a first contact angle $\alpha_2$ is formed as shown in FIG. 1b. In other words, the first contact angle $\alpha_2$ is formed between each roller 15 and any of the first curved inner raceway 20a and the first curved outer raceway 21a such that each roller is inclined in relation to the axial direction of the shaft 2. As is illustrated in FIG. 1b, the first contact angle $\alpha_2$ is defined as the angle between a straight line 7 normal to a centre axis of a roller 15 and the centre axis 5 of the rotor shaft 2 (i.e. a straight line parallel to the plane of rotation). The straight line 7 also represents the line along which the resulting load is transmitted via the roller element 15 from one raceway 21a to another raceway 20a. The straight line 7, i.e. the normal to the centre axis of the roller 15, is thus considered to represent the pressure line of the roller 15. As a consequence, a first pressure centre $P_1$ of the first angular self-aligning contact bearing 11 can be defined by the intersection between the normal 7 to the centre axis of a roller of the first set of rollers 15 and the centre axis of the rotor shaft 5.

The contact angle $\alpha_2$ of the first angular self-aligning contact bearing may also be defined as the angle between the rotational axis of the symmetrical rollers 15 and the centre axis 5 of the rotor shaft 2.

The value of the first contact angle $\alpha_2$ of the first angular self-aligning contact bearing should be appropriately selected. However, in order to provide a tilted or an inclined first angular self-aligning contact bearing, the angle cannot be equal to 0 degrees or 90 degrees, which is clearly understood from FIG. 1*b*. As an example, the value of the first contact angle $\alpha_2$ may be between 10-60 degrees. The value of the first contact angle $\alpha_2$ in FIG. 1 is approximately 45 degrees.

Thus, the first angular self-aligning contact bearing 11 has a pronounced tilted contact angle. In this manner, the rollers 15 are arranged to cooperate with the curved inner raceway 20*a* and the curved outer raceway 21*a* for supporting an axial force $F_1$ and a radial force $F_2$. By this inclined configuration of the rollers 15, the axial movement of the shaft 2 in relation to the first angular self-aligning contact bearing 11 can be restricted. During operation of the rollers 15, the pronounced tiled contact angle contributes to an improved axial load bearing capacity of the first angular self-aligning contact bearing 11. As such, the first angular self-aligning contact bearing 11 is considered to be self-aligning.

Moreover, the configuration of the first angular self-aligning contact bearing 11 allows for reduced or minimal axial and radial width of the bearing arrangement. The angular self-aligning capacity of the first angular self-aligning contact bearing 11 is further advantageous over conventional bearing in that the inclined angular contact bearing requires less manufacturing precision, while maintaining a simple mounting of the bearing arrangement in a fluid machinery application.

A bearing having a configuration corresponding to the configuration of the first angular self-aligning contact bearing may sometimes be denoted as a SAT (self-aligning torus) bearing. A SAT bearing may also be defined (or distinguished) by a distance X being larger than zero (x>0), as is shown in FIG. 1*b*. The distance X is defined by the distance between the rotor shaft centre axis 5 and the normal to the centre axis of the roller 7.

Analogous to the configuration of the first angular self-aligning contact bearing, the second angular self-aligning contact bearing 31 is also a self-aligning bearing. In other words, the second angular self-aligning contact bearing 31 has a second set of rolling elements formed of rollers 35 arranged in a second row 32. By being arranged in a second row means that the second set of rollers 35 are circumferentially arranged around the rotor shaft 2 in a row. Typically, but not strictly necessarily, the second angular self-aligning contact bearing 31 here is provided with a second inner ring 40 and a second outer ring 41. As is illustrated in FIG. 1*b*, the second inner ring is a flangeless inner ring, i.e. the second inner ring is free from a guiding flange.

As shown in FIG. 1, the outer ring 21 is positioned radially outside the inner ring 20.

As mentioned above, the first inner ring 20 typically is movable in relation to the first outer ring 21 in the radial direction. Analogously, the second inner ring 40 typically is movable in relation to the second outer ring 40 in the radial direction of the rotor shaft. Moreover, it should be readily understood that the first outer ring 21 typically is movable in relation to the second outer ring 41.

Moreover, the second set of rollers 35 are interposed between a second curved inner raceway 40*a* of the second inner ring 40 and a second curved outer raceway 41*a* of the second outer ring 41.

In this context of the present invention, it should be readily appreciated that the second curved inner raceway 40*a* may alternatively be formed directly in a part of the shaft 2. Hence, the second curved inner raceway 40*a* may not necessarily be a part of an inner ring.

As may be gleaned from FIG. 1*b*, each roller 35 is a symmetrical cylindrically shaped roller having a curved raceway-contacting surface 35*a* being engageable (or in contact) with the second curved inner raceway 40*a* and the second curved outer raceway 41*a*.

In addition, each roller 35 of the second angular self-aligning contact bearing 31 is inclined in relation to the axial direction of the shaft 2 by a second contact angle $\alpha_1$. Thus, each roller 35 is inclined in relation to the axial direction of the shaft 2 whereby a second contact angle $\alpha_1$ is formed as shown in FIG. 1*b*. In other words, the second contact angle $\alpha_1$ is formed between each roller 35 and any of the second curved inner raceway 40*a* and the second curved outer raceway 41*a* such that each roller 35 is inclined in relation to the axial direction of the shaft 2. The second contact angle $\alpha_1$ is defined as the angle between a straight line 7' normal to a centre axis of a roller 35 and the centre axis 5 of the rotor shaft 2 (i.e. a straight line parallel to the plane of rotation). The straight line 7' also represents the line along which the resulting load is transmitted via the roller element 35 from one raceway 41*a* to another raceway 40*a*. The straight line 7', i.e. the normal to the centre axis of the roller 35, is thus considered to represent the pressure line of the roller 35. As a consequence, a second pressure centre $P_2$ of the second angular self-aligning contact bearing 31 can be defined by the intersection between the normal 7' to the centre axis of a roller of the first set of rollers 35 and the centre axis of the rotor shaft 5.

The second contact angle $\alpha_1$ of the second angular self-aligning contact bearing may also be defined as the angle between the rotational axis of the symmetrical rollers 35 and the centre axis 5 of the rotor shaft 2. The value of the second contact angle $\alpha_1$ of the second angular self-aligning contact bearing should be appropriately selected. However, in order to provide a tilted or an inclined second angular self-aligning contact bearing, the angle cannot be equal to 0 degrees or 90 degrees, which is clearly understood from FIG. 1*b*. As an example, the value of the second contact angle $\alpha_1$ may be between 10-60 degrees. The value of the second contact angle $\alpha_1$ in FIG. 1 is approximately 45 degrees.

Thus, the second angular self-aligning contact bearing 31 has a pronounced tilted contact angle. In this manner, the rollers 35 are arranged to cooperate with the curved inner raceway 40*a* and the curved outer raceway 41*a* for supporting an axial force $F_1$ and a radial force $F_2$. By this inclined configuration of the rollers 35, the axial movement of the shaft 2 in relation to the second angular self-aligning contact bearing 31 can be restricted. During operation of the rollers 35, the pronounced tiled contact angle contributes to an improved axial load bearing capacity of the second angular self-aligning contact bearing 31. As such, the second angular self-aligning contact bearing 31 is considered to be self-aligning.

Moreover, the configuration of the second angular self-aligning contact bearing 31 allows for reduced or minimal axial and radial width of the bearing arrangement. The angular self-aligning capacity of the second angular self-aligning contact bearing 31 is further advantageous over conventional bearings in that the inclined angular contact bearing requires less manufacturing precision, while maintaining a simple mounting of the bearing in a fluid machinery application.

As is further illustrated in FIG. 1*b*, each roller 15 of the first angular self-aligning contact bearing 11 is inclined in relation to each roller 35 of the second angular self-aligning contact bearing 31. In this manner, the first pressure centre $P_1$ of the first angular self-aligning contact bearing 11 is displaced from the second pressure centre $P_2$ of the second angular self-aligning contact bearing 31. In other words, there is no intersection between the normal 7 to the centre axis of a roller of the first set of rollers (first pressure line) and the normal 7' to the centre axis of a roller of the second set of rollers (second pressure line) along the centre axis of the rotor shaft 5.

In one example embodiment (although not shown), the value of the first contact angle $\alpha_2$ may be distinct from the value of the second contact angle $\alpha_1$. In this manner, the bearing arrangement may be provided with asymmetric rows, i.e. the inclination of the first row of the first set of rollers is different to the inclination of the second row of the second set of rollers. One advantage with this configuration is that size of the bearing arrangement can be adjusted to meet the demands of a certain wind turbine arrangement. In other words, the size of the bearing arrangement can kept to a minimum.

Turning again to the example embodiment as shown in FIG. 1b, and as mentioned above, the first curved inner raceway 20a may be arranged in a first inner ring 20 of the first angular self-aligning contact bearing 11. Analogously, the first curved outer raceway 21a may be arranged in a first outer ring 21 of the first angular self-aligning contact bearing 11. In this manner, the outer ring 21 encircles the inner ring 20, whereby the set of rolling elements formed of the rollers 15 is arranged in an intermediate configuration between the first inner ring 20 and the first outer ring 21. Moreover, the second curved inner raceway 40a may be arranged in a second inner ring 40 of the second angular self-aligning contact bearing 31. Analogously, the second curved outer raceway 41a may be arranged in a second outer ring 41 of the second angular self-aligning contact bearing 31. In this manner, the second outer ring 41 encircles the second inner ring 40, whereby the set of rolling elements formed of the rollers 35 is arranged in an intermediate configuration between the second inner ring 40 and the second outer ring 41.

In another example embodiment (not shown), the first curved outer raceway 21a and the second curved outer raceway 41a may be arranged in the same outer ring. Hence, the axially locating bearing can be provided with a single outer ring having two curved outer raceways, one raceway for the first set of rollers 15 and a second raceway for the second set of rollers 35. In this context of the present invention, the first angular self-aligning contact bearing 11 and the second angular self-aligning contact bearing 31 are configured to share the outer ring.

Furthermore, each side of the axially locating bearing 10 may further be sealed off by means of a seal (not shown). The seal can be provided in the form of a one-piece homogeneous component, typically made from a material that is softer as compared to the material of the bearing rings. Such material can be rubber or any suitable type of plastic material. This means that the production costs can be kept low in comparison to conventional bearing seals, which are often composed of components of different material (rubber and metallic reinforcements).

In the context of the present invention, either one of the first angular self-aligning contact bearing and the second angular self-aligning contact bearing here is provided with a radial clearance and an axial clearance which is defined by the difference in distance between the inner curved raceway and the outer curved raceway of the angular contact bearing.

In the illustrated example embodiment, the curved outer raceway 21a of the first angular self-aligning contact bearing 11 and the curved outer raceway 41a of the second angular self-aligning contact bearing 31 are facing away from each other, as seen in the axial direction A. In other words, the pair of the first angular self-aligning contact bearing 11 and the second angular self-aligning contact bearing 31 is mounted in a so-called back-to-back arrangement, also sometimes denoted X-arrangement.

However, it should be readily understood that the curved outer raceway 21a of the first angular self-aligning contact bearing 11 may facing the curved outer raceway 41a of the second angular self-aligning contact bearing 31, as seen in the axial direction A. This is sometimes denoted a so-called face-to-face arrangement, or O-arrangement.

In the illustrated example embodiment in FIG. 1a or 1b, the first angular self-aligning contact bearing 11 and the second angular self-aligning contact bearing 31 here are further contained in a bearing housing 8. The bearing housing 8 is integrally formed in a housing structure arrangement arranged to be mounted in the nacelle framing.

As previously mentioned above, the bearing arrangement 1 includes an axially non-locating bearing 12. The axially non-locating bearing 12 here comprises a third inner ring 50, a third outer ring 51, and a third set of rolling elements formed of rollers 55 arranged in an intermediate configuration between third inner ring and the third outer ring. As shown in FIG. 1a, the axially non-locating bearing 12 is a self-aligning bearing, such as a toroidal bearing, having curved contacting surfaces 55a of the rolling elements and the inner and outer raceways 50a, 51a. In a similar manner as described in relation to the axially locating bearing, each roller 55 is a symmetrical cylindrically roller having a curved raceway-contacting surface 55a arranged in contact with a curved inner raceway 50a of the third inner ring 50 and in contact with a curved outer raceway 51a of the third outer ring 51 in order to allow for angular displacement of the rotor shaft 2. Moreover, each roller 55 here has a symmetrical convex, or barrel-shaped, profile, i.e. an axially centre portion having an increase radial width in relation to the opposite axial end portions. By the configuration of the axially non-locating bearing, the bearing is designed so that the rollers will always position themselves in the raceways for optimum load carrying performance. In this manner, the bearing is capable of accommodating misalignment and axial displacement without affecting the bearing service life.

Similar to the configuration of the previous bearings, the third set of rolling elements formed of rollers 55 here is arranged in a third row 56 and interposed between a third curved inner raceway 50a of a third inner ring 50 and a third curved outer raceway 51a of a third outer ring 51. In addition, each roller 55 is a symmetrical cylindrically shaped roller having a third curved raceway-contacting surface 55a being engageable with the third curved inner raceway 50a and the third curved outer raceway 51a, whereby the rollers 55 are arranged to cooperate with the third curved inner raceway 50a and the third curved outer raceway 51a for supporting the radial force $F_2$. This may be clearly understood from FIG. 2a, which illustrates that the third outer ring encircle the third inner ring such that the third set of rolling elements formed of rollers is arranged in an intermediate configuration between the third inner ring and the third outer ring.

Thanks to the bearing arrangement of the present invention, there is provided a bearing arrangement which is particularly suitable for a two point suspension system, i.e. supporting the wind turbine rotor shaft arrangement at a first support point spaced apart from a second support point. Principally, this is realized that the axially non-locating bearing is arranged spaced apart from the axially locating bearing position, as seen in the axial direction A and the specific configuration of the axially non-locating bearing and the axially locating bearing position. In other words, the bearing arrangement includes two bearing modules (i.e. the axially non-locating bearing and the axially locating bearing(s)) within one single bearing arrangement system. Furthermore, the bearing arrangement has an optimized internal geometry, while conferring maximum radial and axial load carrying capacity. The present invention is further robust in the sense that the bearing arrangement is less sensitive to misalignment caused by shaft or housing deflections as a result of heavy loads. Since the axially non-locating bearing position and the axially locating bearing position is provided in the form of a bearing arrangement, the installation and mounting of the bearing arrangement is simplified in the fluid machinery application, enabling a more efficient and compact fluid machine designs.

In addition, the self-aligning capacity of the bearing arrangement is optimized. Thereby, it becomes possible to support axial and radial loads in a simple yet effectual and reliable manner. The bearing arrangement of the present invention is thereby configured for allowing angular misalignments and also large axial displacements.

In another example embodiment (although not shown), the self-aligning bearing of the present invention has two rows of rollers sharing a common outer race provided with a common concave spherical raceway, while the inner race is provided with two concave spherical raceways that form an angle with the bearing axis. The curvature centre of the outer raceway is consistent with the bearing centre. The self-aligning roller bearing is self-adjusted, and it is not affected by non-centering or shaft deformation flexure of shaft and bearing block, so it can compensate the concentricity error caused by these reasons. Except being subject to radial load, this type of bearing can also be subject to bidirectional axial load and their combination load. The load capacity is large, and the bearing arrangement is provided with preferable shock resistant capacity.

Although the invention has been described in relation to specific combinations of specific rotor arrangements, it should be readily appreciated that a use of the bearing arrangement may be combined in other fluid machinery applications as well which is clear for the skilled person when studying the present application. Thus, the above description of the example embodiment of the present invention and the accompanying drawings are to be regarded as a non-limiting example of the invention and the scope of protection is defined by the appended claims. Any reference sign in the claims should not be construed as limiting the scope.

REFERENCE NUMERALS 1 bearing arrangement
2 rotor shaft
5 rotor shaft centre axis
7, 7' normal to centre axis of first roller, second roller
8 axially locating bearing housing
9 axially non-locating bearing housing
10 axially locating bearing (position)
11 first angular self-aligning contact bearing
12 axially non-locating bearing (position)
15 first set of rolling elements formed of the rollers
15a curved race-way contacting surface
20 first inner ring
20a first curved inner raceway
21 first outer ring
21a first curved outer raceway
22 first row of rollers
30 non-rotating housing structure
31 second angular self-aligning contact bearing
32 second row of rollers
33 first support point
34 second support point
35 second set of rolling elements formed of the rollers
35a curved race-way contacting surface
40 second inner ring
40a second curved inner raceway
41 second outer ring
41a second curved outer raceway
50 third inner ring
50a third curved inner race-way
51 third outer ring
51a third curved outer race-way
55 third set of rolling elements formed of rollers
55a third curved race-way contacting surface
56 third row of rollers
66 wind turbine blades
71 hub arrangement
72 gear box
73 generator
74 nacelle housing
75 tower-like support structure
100 fluid machinery application—e.g. wind turbine rotor shaft arrangement
$\alpha_2$ first contact angle
$\alpha_1$ second contact angle
A axial direction
$F_1$ axial force
$F_2$ radial force
$P_1$ first pressure centre
$P_2$ second pressure centre

What is claimed is:

1. A bearing arrangement for a fluid machinery application having an axially locating bearing position and an axially non-locating bearing position, the bearing arrangement comprising:
wherein the axially locating bearing position comprises:
a first angular self-aligning contact bearing arranged next to a second angular self-aligning contact bearing for locating a shaft against movement in an axial direction;
the first angular self-aligning contact bearing having a first set of rolling elements arranged in a first row and interposed between a first curved inner raceway and a first curved outer raceway, wherein each roller is a symmetrical roller having a curved raceway-contacting surface being engageable with the first curved inner raceway and the first curved outer raceway,
wherein each of the first set of rolling elements of the first angular self-aligning contact bearing is inclined in relation to the axial direction of the shaft by a first contact angle; whereby the first set of rolling elements are arranged to cooperate with the first curved inner raceway and the first curved outer raceway for supporting an axial force and a radial force; and
the second angular self-aligning contact bearing having a second set of rolling elements arranged in a second row and interposed between a second curved inner raceway and a second curved outer raceway, wherein each of the second set of rolling elements is a symmetrical roller having a curved raceway-contacting surface being engageable with the second curved inner raceway and the second curved outer raceway, rotor shaft, and wherein an axial force and a radial force transmitted to the plurality of blades by the fluid is further transmitted to the rotor shaft;
a bearing arrangement arranged on the rotor shaft, the bearing arrangement comprising:
an axially locating bearing position arranged on the rotor shaft, the axially locating bearing position further comprising:
a first angular self-aligning contact bearing arranged next to a second angular self-aligning contact bearing for locating the rotor shaft against movement in an axial direction;
the first angular self-aligning contact bearing having a first set of rolling elements arranged in a first row and interposed between a first curved inner raceway and a first curved outer raceway, wherein each of the first set of rolling elements is a symmetrical convex shaped roller having a first curved raceway-contacting surface being engageable with the first curved inner raceway and the first curved outer raceway, the first curved inner raceway, the first curved outer raceway, and the first curved raceway-contacting surface are all curved with respect to the axial direction,
wherein each of the first set of rolling elements of the first angular self-aligning contact bearing is inclined in relation to the axial direction of the rotor shaft by a first contact angle; whereby the first set of rolling elements are arranged to cooperate with the first curved inner raceway and the first curved outer raceway for supporting the axial force and the radial force; and
the second angular self-aligning contact bearing having a second set of rolling elements arranged in a second row and interposed between a second curved inner raceway and a second curved outer raceway, wherein each of the second set of rolling elements is a symmetrical convex shaped roller having a second curved raceway-contacting surface being engageable with the second curved inner raceway and the second curved outer raceway, the second curved inner raceway, the second curved outer raceway, and the second curved raceway-contacting surface are all curved with respect to the axial direction,
wherein each of the second set of rolling elements of the second angular self-aligning contact bearing is inclined in relation to the axial direction of the rotor shaft by a second contact angle;
whereby the second set of rolling elements are arranged to cooperate with the second curved inner raceway and the second curved outer raceway for supporting the axial force and the radial force;
wherein the first set of rolling elements and the second set of rolling elements are toroidal;
wherein, when viewed in cross section, the first curved outer raceway of the first angular self-aligning contact bearing and the second curved outer raceway of the second angular self-aligning contact bearing are each curved and configured to form a point therebetween such that the first curved outer raceway and the second curved outer raceway do not lie along a single, common circular perimeter;
a second bearing position is arranged on the rotor shaft and spaced axially apart from the axially locating wherein each of the second set of rolling elements of the second angular self-aligning contact bearing is inclined in relation to the axial direction of the shaft by a second contact angle;
whereby the second set of rolling elements are arranged to cooperate with the second curved inner raceway and the second curved outer raceway for supporting the axial force and the radial force;
wherein each the first set of rolling elements of the first angular self-aligning contact bearing is inclined in relation to each of the second set of rolling elements of the second angular self-aligning contact bearing such that axial displacement of the shaft relative to the first and second angular self-aligning contact bearings is prevented;
wherein the first set of rolling elements and the second set of rolling elements are toroidal;
wherein, when viewed in cross section, the first curved outer raceway of the first angular self-aligning contact bearing and the second curved outer raceway of the second angular self-aligning contact bearing are each curved and configured to form a point therebetween such that the first curved outer raceway and the second curved outer raceway do not lie along a single, common circular perimeter;
wherein the axially non-locating bearing position is arranged axially spaced apart from the axially locating bearing position, the axially non-locating bearing position not being configured to support axial force sufficiently to, on its own, prevent displacement between the rotor shaft and a third curved outer raceway of the axially non-locating bearing position since the third curved outer raceway and a third curved inner raceway of the axially non-locating bearing position are configured to be misalignable and to be axially displaceable from each other and to be angularly displaceable from each other, the axially non-locating bearing position includes a third set of rolling elements arranged in a third row and interposed between a third curved inner raceway of the third inner ring and the third curved outer raceway of a third outer ring, wherein each of the third set of rolling elements is a toroidal roller having a symmetrical convex shape and having a third curved raceway-contacting surface being engageable with the third curved inner raceway and the third curved outer raceway along an outer surface thereof, each of the third set of rolling elements being elongated, whereby the rollers are arranged to cooperate with the third curved inner raceway and the third curved outer raceway for supporting the radial force;
wherein the first curved outer raceway of the first angular self-aligning contact bearing is facing the second curved outer raceway of the second angular self-aligning contact bearing such that the first and second angular self-aligning contact bearings form an X-arrangement.

2. The bearing arrangement according to claim 1, wherein the first curved inner raceway is arranged in a first inner ring of the first angular self-aligning contact bearing and/or the first curved outer raceway is arranged in a first outer ring of the first angular self-aligning contact bearing.

3. A fluid machine configured to extract energy from a fluid in motion, the fluid machine comprising:
a plurality of blades that are configured to be rotated by the fluid directly contacting the plurality of blades;
a rotor shaft connected to the plurality of blades such that rotation of the plurality of blades by the fluid drives the bearing position, the second bearing position comprises a bearing comprising a third set of rolling elements interposed between a third curved inner raceway and a third curved outer raceway, the second bearing position not being configured to support axial force sufficiently to, on its own, prevent displacement between the rotor shaft and the third curved outer raceway since the third curved outer raceway and the third curved inner raceway are configured to be misalignable and to be axially displaceable from each other and to be angularly displaceable from each other, wherein each of the third set of rolling elements is a toroidal roller having a symmetrical convex shape and having a third curved raceway-contacting surface being engageable with the third curved inner raceway and the third curved outer raceway.

4. The fluid machine of claim 3, wherein each of the first set of rolling elements of the first angular self-aligning contact bearing is inclined in relation to each of the second set of rolling elements of the second angular self-aligning contact bearing such that a first pressure centre of the first angular self-aligning contact bearing is displaced from a second pressure centre of the second angular self-aligning contact bearing, the first pressure centre having a first axial location that axially overlaps the second angular self-aligning contact bearing and the second pressure centre having a second axial location that axially overlaps the first angular self-aligning contact bearing wherein the first contact angle is different from the second contact angle.

5. The fluid machine of claim 4, further comprising a gear box connected to the rotor shaft and having an output shaft, the gear box being configured to alter the rotational speed of the rotor shaft such that the output shaft has a different rotational speed than the rotor shaft.

6. The fluid machine according to claim 4, wherein the axially locating bearing position is spaced from the second bearing position by a distance equal to one-hundred percent (100%) of an outer diameter of the rotor shaft.

7. The fluid machine according to claim 3, wherein the first curved inner raceway is arranged in a first inner ring of the first angular self-aligning contact bearing and/or the first curved outer raceway is arranged in a first outer ring of the first angular self-aligning contact bearing.

8. The fluid machine according to claim 3, wherein the first angular self-aligning contact bearing and the second angular self-aligning contact bearing are secured in a bearing housing, the bearing housing being separate and spaced from the housing that contains the bearing containing the third set of rollers.

9. The fluid machine according to claim 3, wherein the fluid machine is one of: a wind turbine arrangement and a water turbine arrangement.

10. The fluid machine according to claim 3, wherein the rotor shaft is operatively connected to turbine blades, whereby the rotor shaft is capable of supporting the rotational movement of the turbine blades.

11. The fluid machine according to claim 3, wherein the axially locating bearing position is spaced from the second bearing position by a distance equal to fifty percent (50%) of an outer diameter of the rotor shaft.

12. The fluid machine according to claim 3, wherein the axially locating bearing position is spaced from the second bearing position by a distance equal to seventy-five percent (75%) of an outer diameter of the rotor shaft.

13. The fluid machine according to claim 3, wherein the axially locating bearing position is spaced from the second bearing position by a distance equal to one-hundred fifty percent (150%) of an outer diameter of the rotor shaft.

* * * * *